United States Patent
Rowton

[15] 3,666,788
[45] May 30, 1972

[54] CYANOALKYLATED POLYOXYALKYLENE POLYAMINES

[72] Inventor: Richard Lee Rowton, Austin, Tex.

[73] Assignee: Jefferson Chemical Company, Inc., Houston, Tex.

[22] Filed: Aug. 22, 1969

[21] Appl. No.: 852,487

[52] U.S. Cl...........260/465.5 R, 260/29.2 TN, 260/77.5 C, 260/77.5 AQ, 260/584
[51] Int. Cl......................................................C07c 121/42
[58] Field of Search.........................................260/465.5 R

[56] References Cited

UNITED STATES PATENTS

| | | |
|---|---|---|
| 3,236,895 | 2/1966 | Lee et al............................260/584 B |
| 3,337,606 | 8/1967 | Floyd...............................260/465.5 R |
| 3,364,248 | 1/1968 | Miller, Jr. et al.................260/465.5 R |
| 3,544,615 | 12/1970 | Poppelsdorf.................260/465.5 R X |

OTHER PUBLICATIONS

Degering, " An Outline of Organic Nitrogen Compounds," 1945, pp. 701–702.

*Primary Examiner*—Joseph P. Brust
*Attorney*—Carl G. Ries, John R. Kirk, Jr. and H. G. Jackson

[57] ABSTRACT

Cyanoalkylated polyoxyalkylene polyamines of the formula

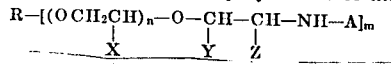

wherein A is a cyano-lower-alkyl radical or hydrogen provided at least one A is a cyano-lower-alkyl radical are useful as coupling agents for polymer formation and as curing agents in sprayed polyurea coatings.

9 Claims, No Drawings

CYANOALKYLATED POLYOXYALKYLENE POLYAMINES

CROSS REFERENCE TO RELATED APPLICATION

My co-pending U.S. Patent Application Ser. No. 852,488, filed Aug. 22, 1969 in which Ernest L. Yeakey is a co-inventor claims the use of the compounds of this invention as reactants with isocyanates for polyurea coatings.

BACKGROUND OF THE INVENTION

1. Field of the Invention

This invention pertains to the field of new organic chemicals.

2. Description of the Prior Art

The compounds of this invention are prepared by the cyanoalkylation of polyoxyalkylene polyamines. Polyoxyalkylene polyamines useful in preparing the compounds of my invention are disclosed in Lee's U.S. Pat. No. 3,236,895 (1966) and in Yeakey's co-pending U.S. Patent Application Ser. No. 602,167 filed Dec. 16, 1966. In spray polyurea coatings, a short delay in curing time is necessary. Polyoxyalkylene polyamines react almost instantaneously with isocyanates; therefore, these amines cannot be used in spray coatings of polyureas or polyurethanes utilizing an isocyanate or isocyanate-prepolymer because of the immediate gel or hardening of the polyurea when the amine is added. By using the cyanoalkylated polyoxyalkylene polyamines of my invention, gel times are such that good mixing of the isocyanate and amine can be obtained and the sprayed material has time enough to adhere and level before gellation of the polyurea coating occurs.

SUMMARY OF THE INVENTION

My invention is compounds of the formula $$R-[(OCH_2CH)_n-O-CH-CH-NH-A]_m$$
$$\phantom{R-[(OCH_2CH)_n-O-}X\phantom{CH-}Y\phantom{CH-}Z$$

where R is the nucleus of an oxyalkylation-susceptible aliphatic polyhydric alcohol containing 2 – 12 carbon atoms and 2 – 8 hydroxyl groups, A is hydrogen, or a cyano-lower-alkyl radical having one or two carbon atoms between the nitrogen and cyano radical provided at least one A is a cyano-lower-alkyl radical, Z is an alkyl group containing 1 — 18 carbon atoms, X and Y are hydrogen or Z, n has an average value of 0 - 50 and m is 2 — 8. R is saturated and consists of carbon and hydrogen. The methyl and ethyl alkyl groups of A may be substituted with lower alkyl groups. The amines of my invention are useful as coupling agents for polymer formation. The amines of my invention are particularly useful as curing agents in polyurea coatings, for example, sprayed polyurea coatings.

DESCRIPTION OF THE PREFERRED EMBODIMENTS

The cyanoalkylated polyoxyalkylene polyamines of my invention are prepared from polyoxyalkylene polyamines. Polyoxypropylene diamines having a molecular weight of about 190 to about 2,000 are useful in preparing the polyoxypropylene diamines of this invention and polyoxypropylene diamines having a molecular weight of about 190 to about 1,000 are preferred starting materials for the compounds of my invention. These amines have the general formula

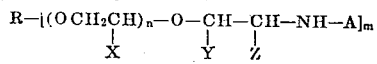

where y is a number from about 2 to about 16. Polyoxypropylene triamines of the formula

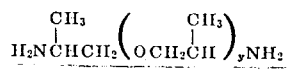

where $x + y + z$ is an average of 5.3 are also useful starting materials for the compounds of my invention. Examples I and II, infra, illustrate typical preparations of the compounds of my invention.

EXAMPLE I

To a solution of 190 g. (1 mol) of polyoxypropylene diamine of 190 molecular weight and 200 ml. of water was added dropwise with stirring 106 g. (2 mols) of acrylonitrile over a 30-minute period. The mixture exothermed, but the temperature was not allowed to go over 50° C. After standing overnight, volatile material was removed under full vacuum at temperatures up to 100° C. Recovery of the reactants was 100 percent. The product, a nearly colorless and somewhat viscous liquid, had the following analysis in milliequivalents per gram:

| Amine | Meq/g. |
|---|---|
| Primary | 0.19 |
| Secondary | 6.69 |
| Tertiary | 0.02 |
| Total | 6.90 |

Thus, the N,N'-disubstituted product of the formula

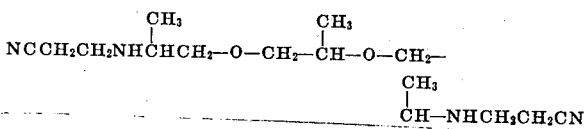

was produced in 97 percent yield. The remaining cyanoethylated compounds of my invention are prepared in the same manner and comparable results are obtained when other polyoxyalkylene polyamines are cyanoethylated with acrylonitrile or methacrylonitrile.

EXAMPLE II

To 400 g. (1 mol) of nitrogen-blanketed polyoxypropylene diamine of 400 molecular weight was added dropwise with stirring 163 g. (2 mols) of 70 percent aqueous glycolonitrile. The mixture exothermed and the reaction was allowed to proceed at 40° – 50° C. After the nitrile addition was complete, the reaction mixture was allowed to stand for several hours at ambient temperatures. A 100 percent excess of calcium hydroxide was added to neutralize the 0.5 percent phosphoric acid present in the nitrile. After standing a few more hours, water was stripped out at up to 120° C. under full vacuum. Filter aid was added and the mixture filtered. A light brown liquid was obtained which had the following analysis:

| Amine | Meq/g. |
|---|---|
| Primary | 0.03 |
| Secondary | 3.92 |
| Tertiary | 0.16 |
| Total | 4.11 |

The remaining cyanomethylated compounds of my invention are prepared in the same manner and comparable results are obtained when other polyoxyalkylene polyamines are reacted with glycolonitrile or lactonitrile. The reactions preparing the compounds of my invention are selective in that N,N'-disubstitution takes place. If complete substitution of the amine hydrogens occurred, the products would not be satisfactory for use as curing agents for polyurethanes.

The following tables illustrate the utility of the compounds of my invention as curing agents for polyurethanes. Gel times are reported in seconds. The following abbreviations are used in the tables:

Amines

JEFFAMINE™ D–X    Polyoxypropylene Diamine of x Molecular Weight

JEFFAMINE T–403    Polyoxypropylene Triamine of 450 Molecular Weight

Amine Suffixes

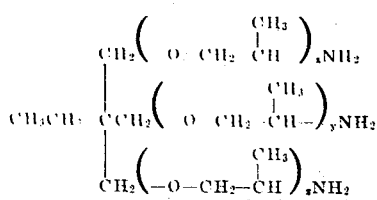

| | |
|---|---|
| CE | N-(2-Cyanoethyl) |
| BCE | N,N'-bis(2-Cyanoethyl) |
| TCE | N,N',N''-tris(2-Cyanoethyl) |
| CM | N-(Cyanomethyl) |
| BCM | N,N'-(Cyanomethyl) |
| Isocyanates | |
| TDI | Toluene Diisocyanate, 80:20 Isomer Mixture |
| LMDI | Liquid Diphenylmethane Diisocyanate |
| HMDI | Hydrogenated MDI |
| PAI | Polymeric Aromatic Isocyanate |
| Polyols | |
| PPG | Polypropylene Glycol of $x$ Molecular Weight |

The abbreviations for the component compositions of the polyureas are illustrated as follows: 3:1 LMDI:TDI/PPG—800 (2/1) is a mixture of three isocyanate equivalents of LMDI and one equivalent of a TDI/PPG—800 prepolymer, the latter being made from two equivalents of TDI and one equivalent of PPG—800. In each of the Tables, a theoretical equivalent amount of the amine component was added to the isocyanate component contained in a small cup while the mixture was stirred as rapidly as possible with a paddle-type stirrer. After 10 seconds of stirring, a portion of the mixture was poured onto a pan and spread out with a spatula to form a film. Gel time in the cup was noted and recorded and the physical nature of the film was recorded. If a solvent was used, it was distributed between the two components so that each component was of low viscosity. Films containing solvent were dried in an oven at 80° C. before evaluation. Those mixtures marked with an asterisk (*) did not gel, but thickened to a fairly stiff consistency in the time noted.

The data in Table II illustrate the practical gel times obtained using cyanoethylated polyoxypropylene diamines and triamines.

The data in Table III illustrates the impracticality of using aliphatic primary amines as curing agents for polyureas because of the extremely short gel times.

TABLE III

| Reactants | | Solvent | | |
|---|---|---|---|---|
| Isocyanate components | Amine components | Name | Amount, percent | Gel time, sec. |
| TDI | Jeffamine™ D-400 | Methyl ethyl ketone | 65 | Immediate. |
| LMDI | Jeffamine D-400 | do | 65 | Do. |
| PAI | do | do | 65 | Do. |
| HMDI | do | Ethoxyethyl acetate | 50 | <1. |
| HMDI | Jeffamine D-403 | do | 50 | Immediate. |
| LMDI/PPG 600 (6/1) | Jeffamine D-400 | Methyl ethyl ketone | 65 | Do. |

Example III illustrates a polyurea spray coating using the cyanoethylated 400 molecular weight polyoxypropylene diamine of my invention.

EXAMPLE III

Component A — a 50:50 weight percent blend of liquid diphenylmethane diisocyanate and hydrogenated liquid diphenylmethane diisocyanate containing 7.3 meq. isocyanate per gram — and Component B — the cyanoethylated 400 molecular weight polyoxypropylene diamine containing 4.4 meq./g. of amino hydrogen and diluted with 5 percent of its weight of methylene chloride — were pumped through a two-component airless Gusmer spray rig at a Component B/Component A ratio of 1.67/1. In the spray rig, the two accurately metered streams of reactants were brought together in a small chamber, rapidly mixed, and ejected through a spray nozzle. The spray was applied to a rigid urethane foam substrate, whereon it gelled within a few seconds. The sprayed film thus protects the foam from abrasion and degradation. Using this technique, a sprayed film of any thickness can be applied to a surface. These sprayed polyurethane coatings are useful protective coatings which can be used in any field where protective coatings are desirable.

Example IV illustrates the utility of the compounds of my invention as coupling agents for polymers. Example IV is the preparation of a urethane latex using bis-cyanoethylated polyoxypropylene diamine of molecular weight 190 as a coupling agent.

TABLE I

| Reactants | | Solvent | | Gel | |
|---|---|---|---|---|---|
| Isocyanate components | Amine components | Name | Amount, percent | time, sec. | Nature of film |
| LMDI | BCE/JEFFAMINE™ D-400 | Methyl ethyl ketone | 50 | 15 | Soft and pliable. |
| Do | CE/JEFFAMINE D-400 | do | 65 | 17 | Stiff and strong. |
| PAI | BCE/JEFFAMINE D-400 | do | 65 | 26 | Fairly stiff and strong. |
| HMDI | do | None | | *60 | Soft and fairly strong. |
| Do | CE/JEFFAMINE D-400 | do | | *30 | Slightly stiff. Fairly resilient. |
| LMDI/PPG-800 (2/1) | BCE/JEFFAMINE D-400 | Toluene | 50 | 15 | Soft. Strong and elastic. |
| LMDI/PPG-800 (6/1) | CE/JEFFAMINE D-400 | Methyl ethyl ketone | 65 | 18 | Fairly stiff. Fair strength and resilience. |
| PAI/PPG-600 (15/1) | BCE/JEFFAMINE D-400 | do | 65 | 12 | Soft and pliable. |
| 1:2 HMDI:LMDI/PPG-800 (6/1) | CE/JEFFAMINE D-400 | do | 35 | 4 | Slightly stiff. Good strength and elasticity. |
| 1:1 HMDI:LMDI/PPG-1000 (4/1) | do | None | | 15 | Soft and elastic. |
| 1:2 PAI:TDI/PPG-600 (2/1) | BCE/JEFFAMINE D-230 | Methylene chloride | 35 | 15 | Soft and pliable. |
| 1:1 LMDI:LMDI/PPG-800 (2/1) | BCE/JEFFAMINE™ D-230 | Toluene | 50 | 12 | Fairly stiff. Fair strength and resilience. |
| 1:1:2 HMDI:PAI:TDI/PPG-600 (2/1) | CE/JEFFAMINE D-230 | Methylene chloride | 35 | 8 | Do. |
| LMDI/PPG-800 (2/1) | TCE/JEFFAMINE T-403 | Methyl ethyl ketone | 65 | 7 | Soft and elastic. |
| HMDI/PPG-800 (2/1) | CE/JEFFAMINE T-403 | Toluene | 50 | ¹5-6 | Do. |
| 2:1 HMDI:TDI/PPG-1000 (2/1) | BCE/JEFFAMINE T-403 | None | | 15 | Fairly stiff. Fair strength and resilience. |

¹ Min.

TABLE II

| Reactants | | Solvent | | Gel | |
|---|---|---|---|---|---|
| Isocyanate components | Amine components | Name | Amount percent | time, sec. | Nature of film |
| TDI | BCM/JEFFAMINE™ D-400 | None | | 30 | Soft and elastic. |
| LMDI | BCM/JEFFAMINE D-400 | do | | *10 | Fairly stiff. Fair strength and resilience. |
| LMDI | CM/JEFFAMINE D-400 | Methyl ethyl ketone | 65 | ¹3-30 | Stiff and strong. |
| PAI | CM/JEFFAMINE D-400 | do | 65 | ¹1½ | Do. |
| PAI | BCM/JEFFAMINE D-400 | Methylene chloride | 35 | 20 | Soft and pliable. |
| HMDI | CM/JEFFAMINE D-400 | None | | *60 | Somewhat stiff. Fair resilience. |
| 8:1 LMDI:TDI/PPG-800 (2/1) | BCM/JEFFAMINE D-400 | do | | 15 | Soft and pliable. |
| 1:2 PAI:TDI/PPG-600 (2/1) | CM/JEFFAMINE D-230 | Methylene chloride | 35 | 45 | Soft but strong. |

¹ Min.

EXAMPLE IV

A prepolymer was made by heating for four hours at 80° — 90° C. a mixture of polyoxypropylene glycol of 800 molecular weight (PPG—800) and a 100 percent molar excess of toluene diisocyanate (TDI). Seven grams of surfactant dissolved in 93 g. of water was added to a stirred solution of 140 g. of the urethane prepolymer and 30 g. of toluene. The resulting emulsion was passed through a homogenizer and then an aqueous solution containing the cyanoethylated compound of Example I, in an amount equivalent to the NCO groups, was added with gentle stirring. The final emulsion contained 50 percent total solids. The resulting latex had excellent mechanical stability. Upon drying, a soft rubber was obtained.

I claim:

1. A compound of the formula

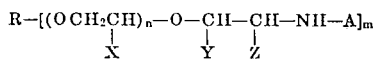

wherein R is the nucleus of an oxyalkylation-susceptible saturated polyhydric alcohol containing 2—12 carbon atoms and 2—8 hydroxyl groups and R consists of carbon and hydrogen, A is a cyano-lower-alkyl radical, Z is an alkyl group containing 1—18 carbon atoms, X and Y are hydrogen or Z, $n$ has an average value of 0—50 and $m$ is 2—8.

2. A compound according to claim 1 wherein the cyano-lower-alkyl radical is cyanoethyl.

3. A compound according to claim 2 of the formula

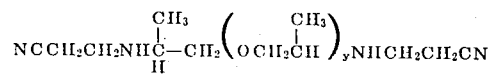

wherein $y$ is a number from 2 to about 16.

4. A compound according to claim 2 of the formula

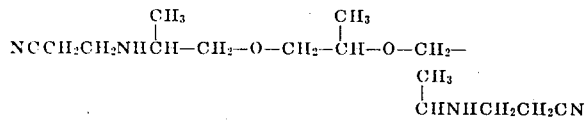

5. A compound according to claim 2 of the formula

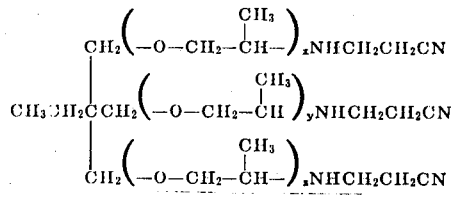

wherein $x + y + z$ is an average of 5.3.

6. A compound according to claim 1 wherein the cyano-lower-alkyl radical is cyanomethyl.

7. A compound according to claim 6 of the formula

wherein $y$ is a number from 2 to about 16.

8. A compound according to claim 7 of the formula

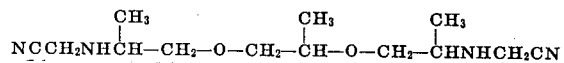

9. A compound according to claim 6 of the formula

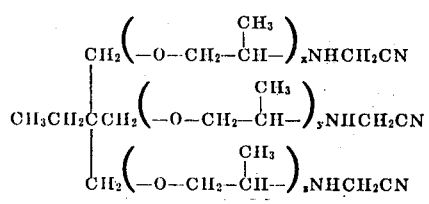

wherein $x + y + z$ is an average of 5.3.

* * * * *